(12) United States Patent
Atkinson

(10) Patent No.: US 9,766,669 B2
(45) Date of Patent: Sep. 19, 2017

(54) AIRFLOW BLOCK RESPONSE IN A SYSTEM

(75) Inventor: Lee W. Atkinson, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 705 days.

(21) Appl. No.: 14/354,085

(22) PCT Filed: Oct. 31, 2011

(86) PCT No.: PCT/US2011/058579
§ 371 (c)(1),
(2), (4) Date: Apr. 24, 2014

(87) PCT Pub. No.: WO2013/066292
PCT Pub. Date: May 10, 2013

(65) Prior Publication Data
US 2014/0285964 A1 Sep. 25, 2014

(51) Int. Cl.
*G06F 19/00* (2011.01)
*G06F 1/20* (2006.01)

(52) U.S. Cl.
CPC .............. *G06F 1/203* (2013.01); *G06F 1/206* (2013.01); *Y02B 60/1275* (2013.01)

(58) Field of Classification Search
USPC ........................................ 361/679.4; 700/276
See application file for complete search history.

(56) References Cited

U.S. PATENT DOCUMENTS

| 6,477,047 | B1 | 11/2002 | Markwardt et al. |
| 7,330,350 | B2 * | 2/2008 | Hellriegel .......... H05K 7/20836 165/122 |
| 7,421,368 | B2 | 9/2008 | Dalton et al. |
| 7,783,903 | B2 | 8/2010 | Piazza et al. |
| 7,809,965 | B2 | 10/2010 | Ziarnik et al. |
| 2002/0050833 | A1 | 5/2002 | Jones et al. |
| 2004/0075981 | A1 * | 4/2004 | Kim .................. G06F 1/206 361/679.47 |
| 2004/0262409 | A1 * | 12/2004 | Crippen ............. F24F 11/006 236/49.3 |
| 2006/0006246 | A1 | 1/2006 | Kim et al. |
| 2008/0238466 | A1 | 10/2008 | Lopez et al. |

(Continued)

FOREIGN PATENT DOCUMENTS

| CN | 101495821 | 7/2009 |
| CN | 102063167 | 5/2011 |

(Continued)

OTHER PUBLICATIONS

PCT Search Report/Written Opinion ~ Application No. PCT/US2011/058579 dated Jun. 26, 2012 ~ 7 pages.

*Primary Examiner* — Kidest Bahta
(74) *Attorney, Agent, or Firm* — Conley Rose P.C.

(57) ABSTRACT

A system including a chassis (102), a vent (130,132) in the chassis to exchange air from outside the chassis with air inside the chassis, a temperature sensor (114) inside the chassis, a power supply (106) to supply power to the system, and a controller (120) coupled to the temperature sensor to perform an airflow block response action (121) if the controller determines the temperature from the temperature sensor is higher than a threshold temperature for a level of power being drawn by the system from the power supply.

19 Claims, 6 Drawing Sheets

(56) References Cited

U.S. PATENT DOCUMENTS

| | | | |
|---|---|---|---|
| 2009/0044027 A1* | 2/2009 | Piazza | G06F 1/3203 |
| | | | 713/300 |
| 2009/0201644 A1* | 8/2009 | Kelley | H05K 7/2079 |
| | | | 361/699 |
| 2009/0296342 A1 | 12/2009 | Matteson et al. | |
| 2010/0312415 A1 | 12/2010 | Loucks | |
| 2011/0046812 A1 | 2/2011 | Hansen et al. | |
| 2013/0344794 A1* | 12/2013 | Shaw | G06F 1/206 |
| | | | 454/258 |

FOREIGN PATENT DOCUMENTS

| CN | 201985650 | 9/2011 |
|---|---|---|
| CN | 202008789 | 10/2011 |

* cited by examiner

AIRFLOW BLOCK RESPONSE IN A SYSTEM

CROSS-REFERENCE TO RELATED APPLICATION

This application is a national stage application under 35 U.S.C. §371 of PCT/US2011/058579, filed Oct. 31, 2011.

BACKGROUND

Computing systems such as a portable computer (e.g., a notebook computer) rely in part on airflow through its chassis to dissipate heat generated by the various components (e.g., displays, hard drives, processors and memory) during normal operation. Additionally, when a clocked-logic component nears its maximum temperature rating, a thermal management controller of the portable computer may reduce the execution speed of the component, reducing the heat generated by the component and preserving its operability. However, cosmetic damage to the surface material of the chassis or user discomfort may occur at temperatures lower than the maximum temperature rating for most components. For example, a person whose skin may be in contact with the bottom surface of the chassis (e.g., when resting the computer on their lap) may become uncomfortable as the surface reaches 40° C., whereas many components have maximum temperature ratings that exceed 100° C.

During normal operation, airflow through the chassis prevents the outer surface from becoming too hot, even when component temperatures are at or near their maximum rating. Some systems may detect a complete failure of the system for thermal evacuation (i.e., when components are at risk of exceeding their maximum temperature ratings) by using thermistors to monitor heat-producing components or by detecting a failure of an exhaust fan.

BRIEF DESCRIPTION OF THE DRAWINGS

For a detailed description of illustrative implementations, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

As used herein, the term "system" refers to a combination of two or more components, which could be a complete computer or a portion thereof.

As used herein, the term "electronic component" refers to a single power-consuming component of the computer system. This includes both mechanical devices (such as displays and hard drives) and clocked-logic semiconductor devices (such as a CPU, memory, and video controller).

As used herein, the term "system load" refers to one or more power-consuming electronic components of a computing system. A system load may refer to a single hardware processor, a combination of a hardware processor and one or more other devices such a memory, or other combinations of power-consuming devices.

DETAILED DESCRIPTION

In some cases, a multitude of temperature sensors are positioned to measure the temperature of the surfaces of the chassis. Thus, rather than detecting an airflow block, the surface temperatures are directly monitored and, if the surface temperatures exceed a tolerable level (which may be well below the maximum temperature rating of the components), the components may be throttled back or shut down. However, the use of additional temperature sensors is expensive and requires additional packaging and design considerations when laying out the interior of the portable computer. In other cases, the speed of a fan may be monitored to determine airflow through the chassis. However, the correlation between fan speed and airflow can be inaccurate and thus may not provide useful information about either the airflow or the chassis surface temperatures.

Figure 1:
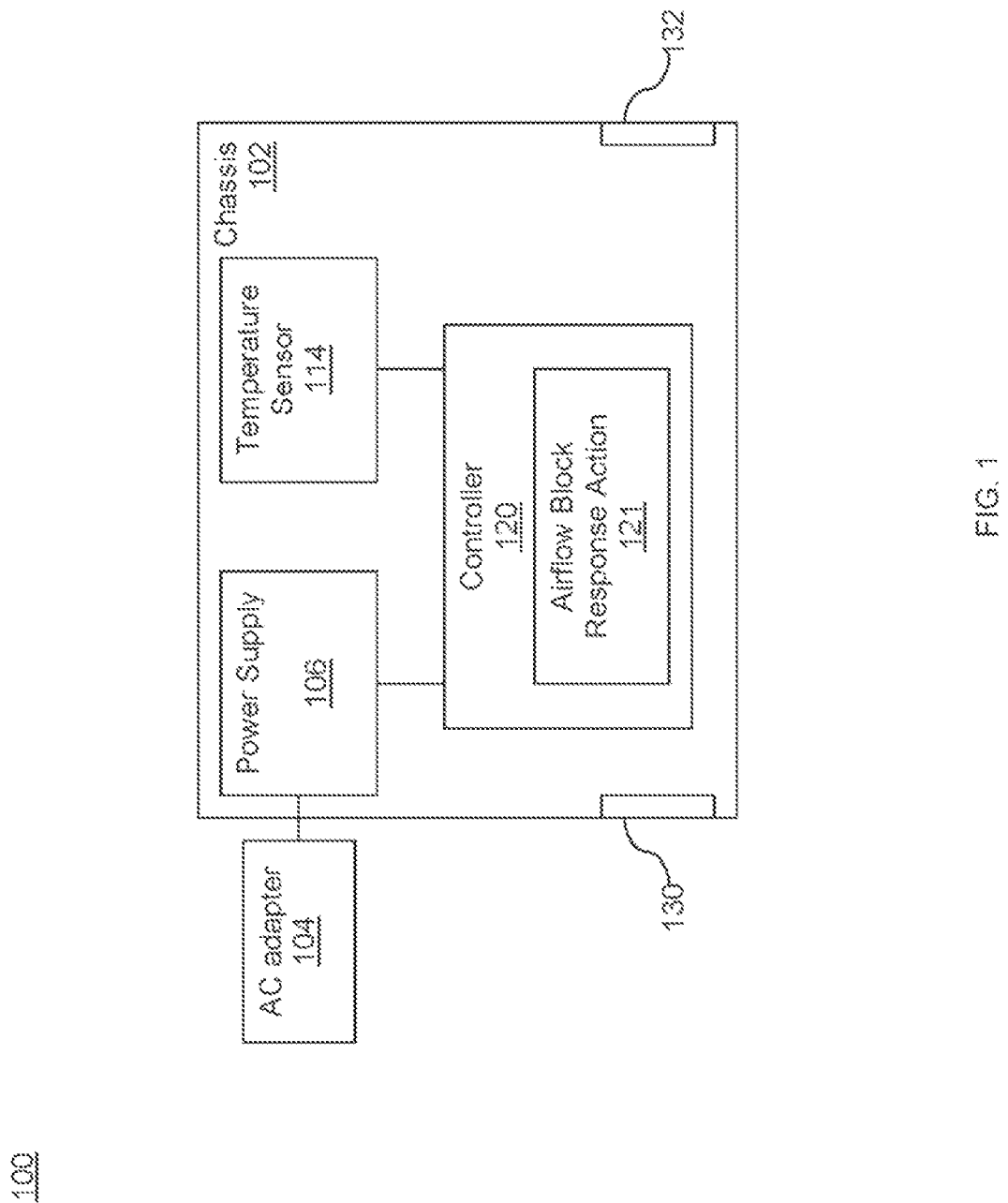
FIG. 1 shows a thermal management system in accordance with various examples.

FIG. 1 shows a computer 100 including a system to detect an airflow block in a cooling system. The computer 100 includes a computer chassis 102, which is supplied with power by an AC adapter 104 that converts AC mains to a DC current used by the computer 100. The chassis 102 may be, for example, a portable computer chassis, such as a notebook computer, handheld computer, personal digital assistant (PDA), or the like. The AC adapter is coupled to a power supply 106 inside the chassis 102. The power supply 106 provides power to various components of the computer 100, which generate heat as a result of their power consumption.

A temperature sensor 114 is installed to monitor the temperature of the system. In some cases, the temperature of individual components may be monitored while in others, the temperature of an area near to certain components may be monitored. An inlet vent 130 and an exhaust vent 132 enable airflow through the chassis 102 to help regulate the temperature of the components of the computer 100.

During normal operation loads, airflow through the chassis 102 is sufficient to dissipate the heat generated by the components of the computer 100 and maintain operating temperatures in an acceptable range. However, when processing demand is high, the temperature of the components of the computer 100 may exceed its optimal range. A thermal management controller (e.g., controller 120), which couples to the temperature sensor 114, may detect such a rise in temperature from the temperature sensor 114 and trigger a reduction in clock speed of various clocked-logic components or, in some cases, cause a shutdown of the computer 100.

In situations where airflow through the chassis 102 is inhibited (e.g., due to blocking of one or both of the inlet port 130 and exhaust port 132), the temperature of the surfaces of the chassis 102 may begin to rise even under normal system operating loads. As explained above, surface damage or user discomfort may occur even at temperatures much lower than the threshold values for the components of the computer 100. As a result, when the processing demand placed on computer 100 is light (e.g., when performing tasks having light processing requirements such as internet browsing or word processing), certain thermal management mechanisms (e.g., reduction in processor speed, shutdown of the computer 100) might not be triggered although an airflow block causes the surfaces of the chassis 102 to exceed desired temperature levels.

An airflow block may be detected by comparing the power consumption of the system with the temperature measured by the temperature sensor 114. Alternately or in addition, the power consumption of an individual electronic component (e.g., a CPU) of the computer 100 may be compared to the measured temperature of that electronic component. Blocked airflow may be indicated when the power consumption is unexpectedly low when compared against the measured temperature. Alternately, blocked airflow may be indicated when the temperature measured by the temperature sensor 114 is unexpectedly high for a level of power being drawn by the system from the power supply 106. If a blocked airflow situation is detected, the controller 120 may cause an airflow block response action 121 to be performed, such as presenting an alert to the user or shutting down the computer 100.

Figure 2:
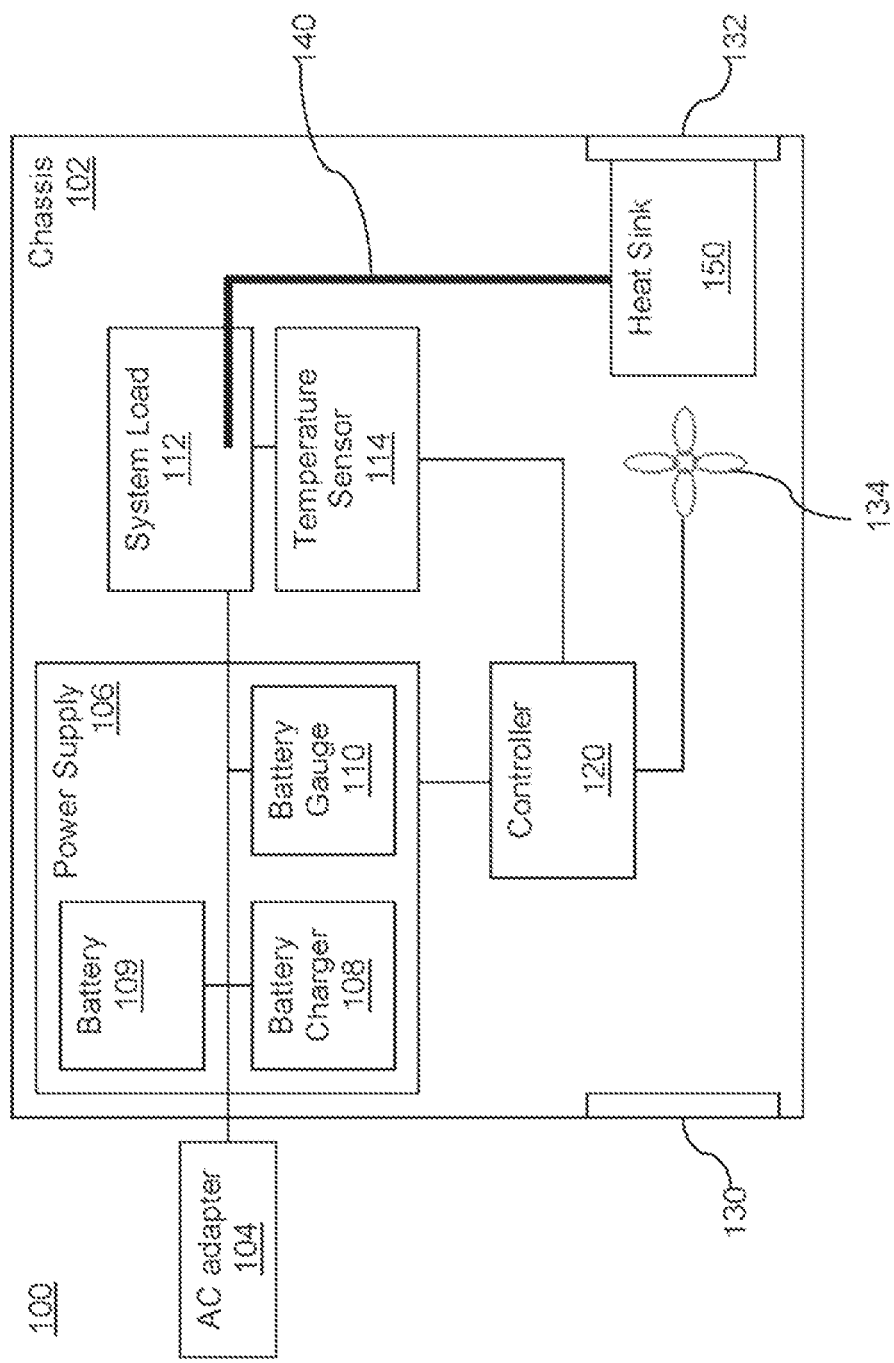
FIG. 2 shows another thermal management system in accordance with various examples.

Turning now to FIG. 2, the computer 100 of FIG. 1 is shown in further detail, including a system to detect an airflow block in a cooling system. Similar to FIG. 1 explained above, the computer 100 includes a computer chassis 102, which is supplied with power by an AC adapter 104 that converts AC mains to a DC current used by the computer 100. The AC adapter is coupled to a power supply 106 inside the chassis 102. The power supply 106 comprises a battery charger 108, a battery 109 and a battery gauge 110. The battery charger 108 may produce a voltage or current to charge the battery 109 and measure the incoming current from the AC adapter 104.

The power supply 106 provides power to a system load 112, which represents the power-consuming electronic components of the computer 100. These include both mechanical devices (such as displays and hard drives) and clocked-logic semiconductor devices (such as a CPU, memory, and video controller). A temperature sensor 114 is installed near to or integrated to various electronic components of the system load 112 to monitor the temperature of the components. In some cases, multiple temperature sensors 114 may be installed near to or integrated to various electronic components of the system load 112.

When the computer 100 is operating on battery power, the voltage of the battery 109 and the current drawn are determined by the battery gauge 110, which may comprise an integrated circuit that functions as both a voltmeter and an ammeter. Thus, the power drawn by the system load 112 may be determined by multiplying voltage and current determined by the battery gauge 110. When the computer 100 is operating on AC power, the battery gauge 110 may measure the current output from the battery charger 108, which is then multiplied by a known supply voltage to determine the power drawn by the system load 112.

A heat sink 150 may be coupled to the system load 112 by way of a heat pipe 140. Alternately, other thermal coupling techniques may be employed in place of the heat pipe 140. The heat sink 150 may comprise a fin array that dissipates heat to the surrounding air. Thermal control of the system load 112 is enabled by the transfer of heat across the heat pipe 140 to the heat sink 150 and then to the air surrounding the heat sink 150. Fresh air enters the chassis 102 through an inlet port 130 and is blown across or around the heat sink 150 by a fan 134. Subsequently, the air exits the chassis 102 through an exhaust port 132.

During normal operation loads, the airflow-based heat exchange mechanism is sufficient to dissipate the heat generated by the system load 112 and maintain operating temperatures in an acceptable range. However, when processing demand is high, the temperature of the system load 112 may exceed its optimal range. A thermal management controller (e.g., controller 120), which couples to the temperature sensor 114, may detect such a rise in temperature from the temperature sensor 114 and trigger a reduction in clock speed of the CPU and other clocked-logic components or, in some cases, cause a shutdown of the system load 112.

In situations where airflow through the chassis 102 is inhibited (e.g., due to fins of the heat sink 150 becoming clogged with dust or due to blocking of one or both of the inlet port 130 and exhaust port 132), the temperature of the surfaces of the chassis 102 may begin to rise. During normal operation, the thermal gradient between the system load 112 and the chassis 102 is large. For example, the ratio of component temperature rise compared to chassis rise may be 5:1. In a notebook computer with a processor operating at 100° C. in ambient air of 25° C., this would result in a chassis 102 temperature of 40° C. This gradient results from the surface of the chassis 102 being exposed to cool air and the flow of heat from the system load 112 to the heat sink 150, which is then evacuated from the chassis 102 by airflow from the inlet port 130 to the exhaust port 132.

However, when the airflow through the chassis 102 is blocked, heat begins to pool inside the chassis 102 and the temperature gradient between the surfaces of the chassis 102 and the system load 112 is reduced. Emissive radiation from the surfaces of the chassis 102 may be small for a notebook computer; thus, when the airflow through the chassis 102 is blocked, the surfaces of the chassis 102 may gradually approach the temperature of the system load 112. As explained above, surface damage or user discomfort may occur even at temperatures much lower than the threshold values for the system load 112. As a result, when the processing demand placed on the system load 112 is light (e.g., when performing tasks having light processing requirements such as internet browsing or word processing), certain thermal management mechanisms (e.g., reduction in processor speed, shutdown of the computer 100) might not be triggered although an airflow block causes the surfaces of the chassis 102 to exceed desired temperature levels. The controller 120 may implement the method explained in further detail below to detect an airflow block, and also to perform an airflow block response action in the case where an airflow block is detected.

Figure 3A:
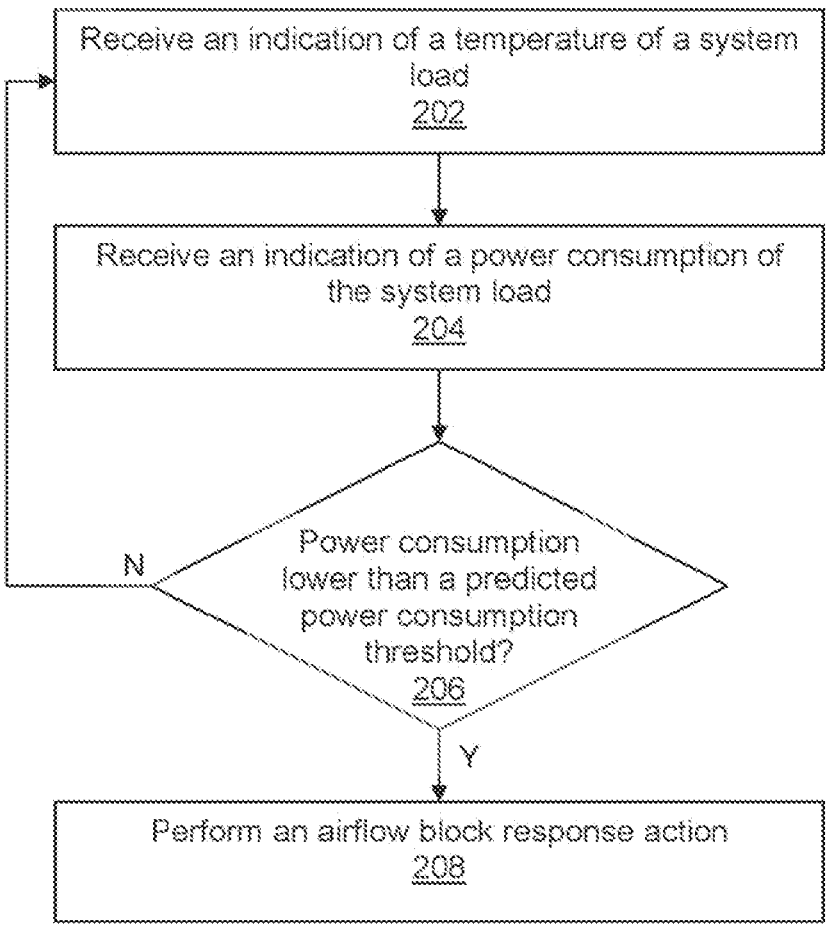
FIG. 3a shows a method for thermal management in accordance with various examples.

Turning now to FIG. 3a, an illustrative method 200 for detecting a block in the airflow is shown. An airflow block may be detected by comparing the power consumption of the system load 112 with the measured temperature of the system load 112. Alternately or in addition, the power consumption of an electronic component (e.g., a CPU) of the system load 112 may be compared to the measured temperature of the electronic component. Blocked airflow may be indicated when the power consumption is unexpectedly low when compared against the temperature of the system load 112 and/or the electronic component. If a blocked airflow situation is detected, an alert may be presented to the user or the computer 100 may be shutdown.

The method 200 begins with a thermal management controller (e.g., controller 120) receiving an indication of a temperature of the system load 112 (block 202). The temperature of the system load 112 may be measured by, for example, the temperature sensor 114. The method 200 continues with the thermal management controller 120 receiving an indication of a power consumption of the system load 112. In some cases, the power supply 106 measures the power consumption of the system load 112 and sends an indication of the power consumption to the thermal management controller 120. Alternately or in addition, the power supply 106 may estimate the power consumption of the system load 112 by measuring the activity of the system load 112 itself. For example, some CPUs may measure CPU activity and temperature and estimate power consumption of the integrated circuit. As another example, certain devices such as a display may measure the brightness of the display and use a lookup table to predict the power consumption of the display based on its brightness.

The method 200 continues by comparing the detected power consumption with a predicted power consumption threshold, which is based on the measured temperature (block 206). The values in the lookup table may be determined experimentally and loaded into the thermal management controller 120. For example, a higher measured temperature would cause the predicted power consumption threshold to be higher, whereas a lower measured temperature would cause the predicted power consumption threshold to be lower. If the measured power consumption is at or above the predicted threshold for the measured temperature, then the computer 100 is operating in an optimal range and airflow through the chassis 102 is not problematic. However, if the measured power consumption is lower than the predicted threshold for the measured temperature, then an airflow block is likely because a low power consumption for a given temperature suggests that heat is not being effectively evacuated from the chassis 102.

If airflow through the chassis 102 is not problematic, the thermal management controller 120 continues to receive indications of both temperature (block 202) and power consumption (block 204) for the system load 112. However, if an airflow block is likely, the method 200 continues with the thermal management controller 120 performing an airflow block response action (block 208). In some examples, the airflow block response action may be in the form of providing a warning to a user. Examples of user warnings include pop-up messages, audible alerts, emails and the like. Alternately or additionally, the airflow block response action may include causing the system to shutdown (e.g., power off or transition to a lower power state) or logging the event in a system log. However, it may be unnecessary to shutdown the system or to reduce the speed of clocked-logic components, so in at least some cases, these actions are not performed. The thermal management controller explained as carrying out the above method may be implemented as an embedded system coupled to the electronic devices 112, as a set of machine-readable instructions executing on the CPU of the computer, or other such device.

Figure 3B:
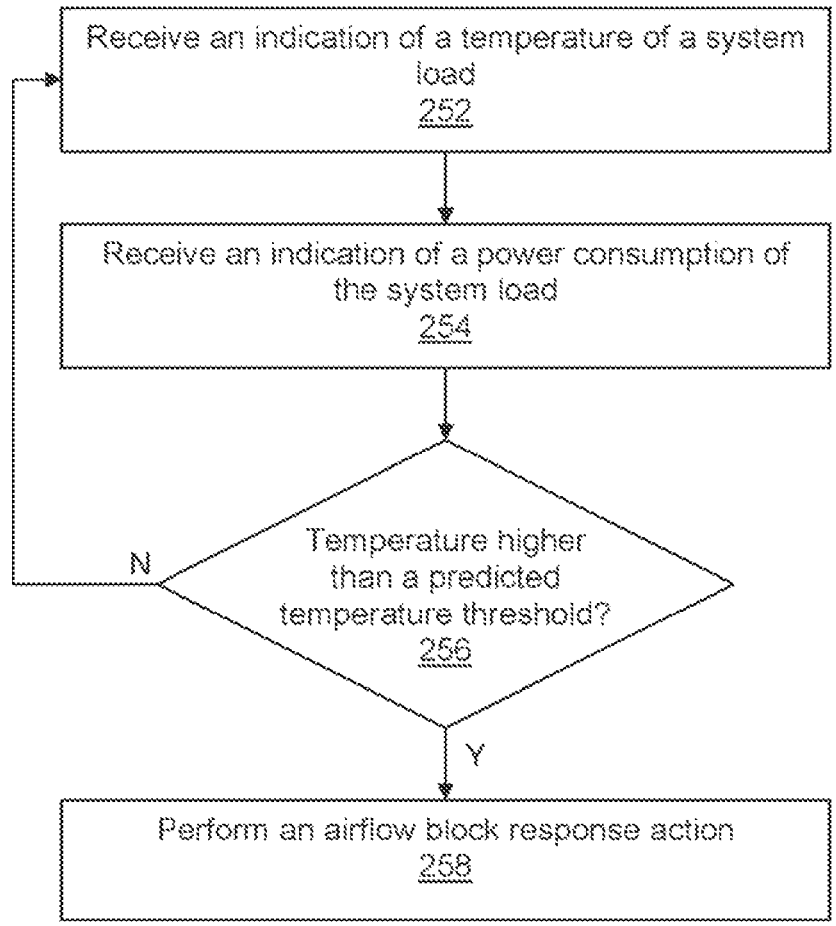
FIG. 3b shows an additional method for thermal management in accordance with various examples.

FIG. 3b shows an alternate method 250 for detecting a block in the airflow. The method 250 is similar to the method 200 of FIG. 3a; however, in block 256, the measured temperature is compared to a predicted temperature threshold, which is based on the measured power consumption. In some cases, a lookup table may be accessed to provide a predicted temperature threshold value for a number of different measured system load 112 or electronic component power consumption levels. The values in the lookup table may be determined experimentally and loaded into the thermal management controller 120. For example, a higher measured power consumption would cause the predicted temperature threshold to be higher, whereas a lower measured power consumption would cause the predicted temperature threshold to be lower. If the measured temperature is below the predicted threshold for the measured power consumption, then the computer 100 is operating in an optimal range and airflow through the chassis 102 is not problematic. However, if the measured temperature is higher than the predicted threshold for the measured power consumption, then an airflow block is likely because a high temperature for a given power consumption suggests that heat is not being effectively evacuated from the chassis 102.

If airflow through the chassis 102 is not problematic, the thermal management controller 120 continues to receive indications of both temperature (block 252) and power consumption (block 254) for the system load 112. However, if an airflow block is likely, the method 200 continues with the thermal management controller 120 performing an airflow block response action (block 258). In some examples, the airflow block response action may be in the form of providing a warning to a user. Examples of user warnings include pop-up messages, audible alerts, emails and the like. Alternately or additionally, the airflow block response action may include causing the system to shutdown or logging the event in a system log. The thermal management controller explained as carrying out the above method may be implemented as an embedded system coupled to the electronic devices 112, as a set of machine-readable instructions (e.g., a system BIOS) executing on the CPU of the computer, or other such device. In some cases, the Advanced Configuration and Power Interface (ACPI) specification may be used to facilitate various power management functions, such as determining power consumption or power states of various hardware elements.

Figure 3C:
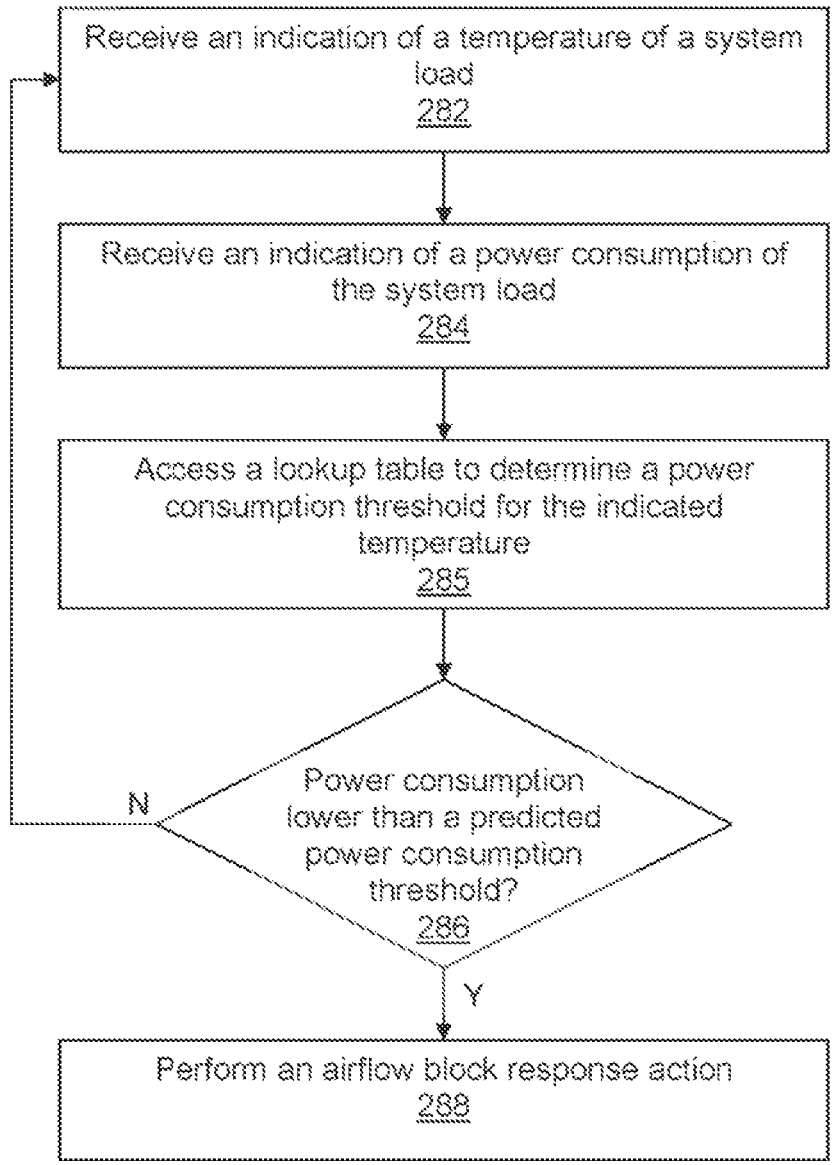
FIG. 3c shows yet another method for thermal management in accordance with various examples.

FIG. 3c shows a method 280 that is similar to that shown in FIG. 3a. For example, blocks 282, 284, 286 and 288 correspond to blocks 202, 204, 206 and 208, respectively. However, the method 280 also includes accessing a lookup table to provide a predicated power consumption threshold value for the indicated temperature (block 205). The lookup table may relate various power consumption thresholds with a number of different measured system load 112 or electronic component temperatures. Then, the indicated power consumption is compared against the determined power consumption threshold (block 288) and the method 280 continues as in FIG. 3a.

In method 200 and 250 of FIGS. 3a and 3b, reference has been made to monitoring the temperature and power consumption of a system load, such as system load 112 of FIG. 1. However, the thermal management controller may similarly measure the temperature and power consumption of an individual electronic component or group of electronic components. Additionally, in some cases, the thermal management controller may measure the temperature of an environment proximate an individual electronic component or group of electronic components and the power consumption of that component or group of components. The scope of this disclosure is intended to cover all such examples, particularly where a measured power consumption is below a power consumption threshold for a measured temperature or where a measured temperature is above a temperature threshold for a measured power consumption, both of which likely indicate an airflow block. As explained above, a lookup table may contain power consumption threshold values, which may be experimentally determined, for a number of measured temperatures. Alternately, the lookup table may contain temperature threshold values, which may be experimentally determined, for a number of measured power consumption levels.

Figure 4:
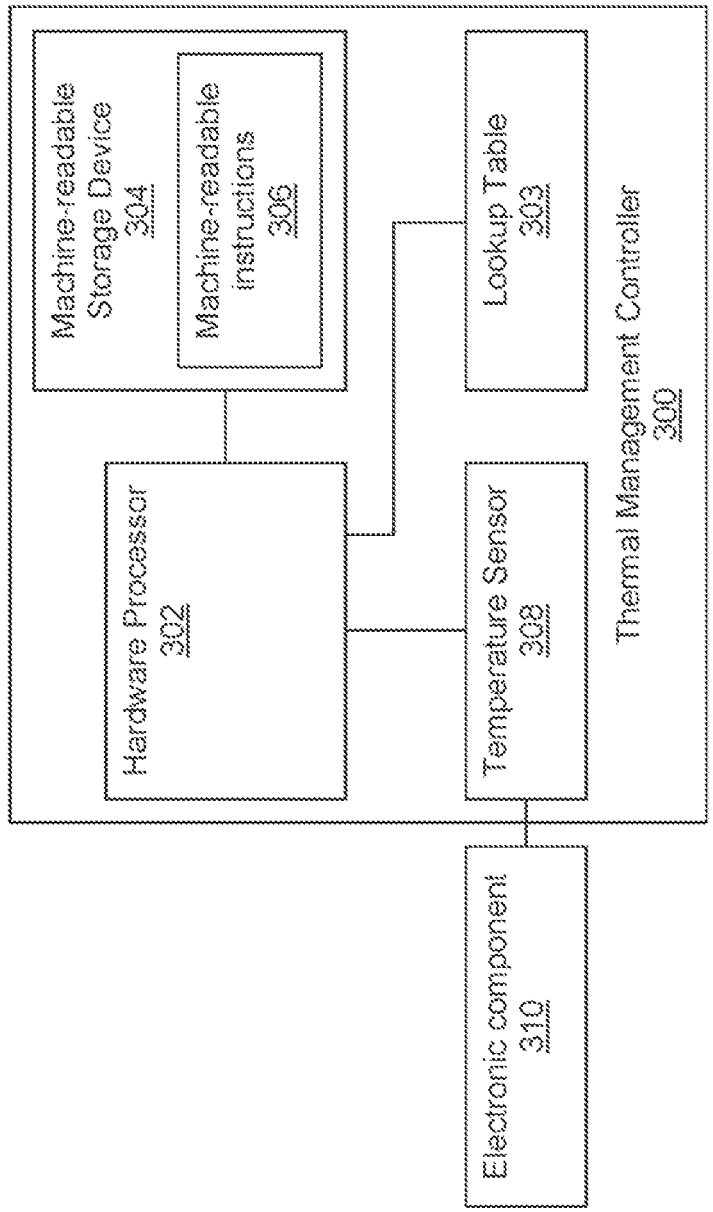
FIG. 4 shows a thermal management controller in accordance with various examples.

FIG. 4 shows an example of a thermal management controller 300 in accordance with various examples. The thermal management controller 300 comprises a hardware processor 302 (e.g., a CPU of the computer 100, a stand alone processor of controller 120) coupled to a machine-readable storage device 304. The thermal management controller 300 may take the form of a controller coupled to the system load 112, such as controller 120 shown in FIG. 1, or may be integrated into the system load 112 itself. The hardware processor 302 is coupled to a temperature sensor 308, which may monitor the temperature of the system load 112 or of various electronic components of the system load 112 such as electronic component 310. The hardware processor 302 is coupled to and may access a lookup table 303, which may be, for example, stored in system memory, non-volatile memory, or the like. The lookup table 303 is similar to those described above with respect to FIGS. 3a and 3b. In some cases, the speed of a fan (e.g., fan 134) may be included in the lookup table 303. For example, a correlation between power consumption and temperature may be performed at any fan speed because thermal performance depends, at least in part, on fan speed.

The machine-readable storage device 304 may comprise a hard drive, a compact disc, floppy disc, flash-based storage or other non-transitory storage device. The machine-readable storage device 304 includes machine-readable instructions 306 that, when executed by the hardware processor 302, cause the hardware processor 302 to carry out some or all of the method 200 of FIG. 3a and/or the method 250 of FIG. 3b.

The above discussion is meant to be illustrative of the principles and various examples of the present invention. Numerous variations and modifications will become apparent to those skilled in the art once the above disclosure is fully appreciated. For example, although the thermal management controller is described as being an embedded system or instructions executed on a CPU, many other processing solutions may be alternately employed that provide the functionality of the thermal management controller as disclosed. As another example, although often referred to as a notebook computer, the computer chassis shown in FIGS. 1 and 2 may be any number of computing devices, such as a desktop computer, a server, a PDA, a tablet computer, and the like. Additionally, reference it is intended that the following claims be interpreted to embrace all such variations and modifications.

What is claimed is:

1. A system comprising:
   a chassis;
   a vent in the chassis to exchange air from outside the chassis with air inside the chassis;
   a temperature sensor inside the chassis;
   a power supply to supply power to the system; and
   a controller coupled to the temperature sensor to:
      obtain a threshold temperature based on a measured level of power being drawn by the system from the power supply, and
      perform an airflow block response action in response to the controller determining that the temperature from the temperature sensor is higher than the threshold temperature.

2. The system of claim 1, wherein the controller is to access a lookup table to retrieve the threshold temperature from the lookup table based on the measured level of power.

3. The system of claim 1, wherein the airflow block response action comprises sending a user warning regarding an airflow block at the vent.

4. The system of claim 1, wherein the airflow block response action comprises shutting down the system.

5. The system of claim 1, wherein the airflow block response action comprises placing the system into a lower power state.

6. A thermal management method, comprising:
   receiving, by a system comprising a hardware processor, an indication of a temperature of a system load from a temperature sensor;
   receiving, by the system, an indication of a power consumption of the system load;
   obtaining, by the system, a predicted power consumption threshold based on the indicated temperature;
   determining, by the system, whether the power consumption is lower than the predicted power consumption threshold for the indicated temperature; and
   in response to the power consumption being lower than the predicted power consumption threshold, performing, by the system, an airflow block response action.

7. The method of claim 6, wherein obtaining the predicted power consumption threshold comprises accessing a lookup table to retrieve the predicted power consumption threshold from the lookup table based on the indicated temperature.

8. The method of claim 6, wherein the airflow block response action comprises generating an alert of an airflow block at an airflow port.

9. The method of claim 6, wherein the airflow block response action comprises shutting down the system load.

10. The method of claim 6, wherein the airflow block response action comprises reducing a power level of the system load.

11. A non-transitory machine-readable storage device storing machine-readable instructions that, when executed by a system comprising a hardware processor, cause the system to:
   receive an indication of a temperature of an electronic component from a temperature sensor;
   receive an indication of a power consumption of the electronic component;
   determine an airflow block condition to exist based on the indication of the temperature and power consumption, wherein the determining comprises:
      obtaining a power consumption threshold based on the temperature, and
      comparing the power consumption to the power consumption threshold; and
   in response to the existence of the airflow block condition, perform an airflow block response action.

12. The non-transitory machine-readable storage device of claim 11 wherein the obtaining comprises accessing a lookup table to retrieve the power consumption threshold from the lookup table based on the temperature.

13. The non-transitory machine-readable storage device of claim 11, wherein the airflow block response action comprises generating a user warning regarding an airflow block in the system.

14. The non-transitory machine-readable storage device of claim 11, wherein the airflow block response action comprises shutting down the system.

15. The non-transitory machine-readable storage device of claim 11 wherein the airflow block response action comprises placing the system into a lower power state.

16. The system of claim 1, further comprising a current sensor to measure a current used to derive the measured level of power.

17. The system of claim 1, wherein the power supply is to provide the measured level of power.

18. The system of claim 1, wherein the measured level of power is a measured first level of power, and the threshold temperature is a first threshold temperature based on the measured first level of power, and the controller is to further:
   obtain a second threshold temperature based on a measured second level of power being drawn by the system from the power supply, the second threshold temperature different from the first threshold temperature; and
   perform an airflow block response action in response to the controller determining that the temperature from the temperature sensor is higher than the second threshold temperature.

19. The method of claim 6, wherein the temperature is a first temperature, and the predicted power consumption threshold is a first predicted power consumption threshold, the method further comprising:
   receiving, by the system, an indication of a second temperature of the system load from the temperature sensor, the second temperature different from the first temperature;
   obtaining, by the system, a second predicted power consumption threshold based on the second temperature, wherein the second predicted power consumption threshold is different from the first predicted power consumption threshold;
   determining, by the system, whether the power consumption is lower than the second predicted power consumption threshold for the indicated second temperature; and
   in response to the power consumption being lower than the second predicted power consumption threshold, performing, by the system, an airflow block response action.

* * * * *